United States Patent
Gschwind et al.

(10) Patent No.: US 10,691,456 B2
(45) Date of Patent: Jun. 23, 2020

(54) VECTOR STORE INSTRUCTION HAVING INSTRUCTION-SPECIFIED BYTE COUNT TO BE STORED SUPPORTING BIG AND LITTLE ENDIAN PROCESSING

(71) Applicant: International Business Machines Corporation, Armonk, NY (US)

(72) Inventors: Michael Karl Gschwind, Chappaqua, NY (US); Brett Olsson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 14/941,027

(22) Filed: Nov. 13, 2015

(65) Prior Publication Data
US 2017/0139713 A1     May 18, 2017

(51) Int. Cl.
*G06F 9/30* (2018.01)

(52) U.S. Cl.
CPC ...... *G06F 9/30112* (2013.01); *G06F 9/30036* (2013.01); *G06F 9/30043* (2013.01); *G06F 9/30192* (2013.01)

(58) Field of Classification Search
CPC .................... G06F 9/30036; G06F 9/30043
See application file for complete search history.

(56) References Cited

U.S. PATENT DOCUMENTS

| | | | |
|---|---|---|---|
| 5,928,349 A * | 7/1999 | Loen ......................... | G06F 9/34 712/1 |
| 6,173,366 B1 | 1/2001 | Thayer et al. | |
| 6,266,758 B1 | 7/2001 | van Hook et al. | |
| 6,629,115 B1 | 9/2003 | Rossignol | |
| 6,728,874 B1 * | 4/2004 | Sijstermans ............ | G06F 7/768 712/222 |

(Continued)

FOREIGN PATENT DOCUMENTS

| | | |
|---|---|---|
| EP | 1873627 A1 | 1/2008 |
| WO | 2012134532 A1 | 10/2012 |

(Continued)

OTHER PUBLICATIONS

Guštin et al., "Extracting SIMD parallelism from 'for' loops", IEEE Xplore Digital Library, Aug. 7, 2002 [Available Online] http://ieeexplore.ieee.org/document/951843/?part=1 [Abstract Only].

(Continued)

*Primary Examiner* — Jacob Petranek
(74) *Attorney, Agent, or Firm* — Patterson + Sheridan, LLP (57) ABSTRACT

A method is disclosed for storing vector data into memory with a processor. The method includes obtaining, by the processor, a variable-length vector store instruction. The method also includes determining that the vector store instruction specifies a vector register for a source, a memory address, and a length, where the memory address and the length are each specified in at least a general purpose register. The method also includes determining whether data should be stored into memory at the memory address using big endian byte-ordering or little endian byte-ordering. The method further includes storing data from the vector register into memory, where if the length is less than a length of the vector register, storing only the data from the vector register specified by the length.

15 Claims, 5 Drawing Sheets

(56) References Cited

U.S. PATENT DOCUMENTS

| | | |
|---|---|---|
| 7,620,797 B2 | 11/2009 | Gonion et al. |
| 7,908,460 B2 | 3/2011 | Liao et al. |
| 2002/0087846 A1 | 7/2002 | Nickolls et al. |
| 2005/0053012 A1* | 3/2005 | Moyer ................ G06F 9/30036 370/254 |
| 2005/0125647 A1* | 6/2005 | Symes .................... G06F 7/768 712/300 |
| 2008/0114969 A1 | 5/2008 | Gonion et al. |
| 2009/0204785 A1 | 8/2009 | Yates, Jr. et al. |
| 2009/0228657 A1 | 9/2009 | Hagiwara |
| 2011/0145543 A1* | 6/2011 | Damron ............. G06F 9/30014 712/3 |
| 2011/0320765 A1* | 12/2011 | Karkhanis ........... G06F 9/30109 712/7 |
| 2013/0246739 A1 | 9/2013 | Bradbury et al. |
| 2013/0246740 A1 | 9/2013 | Bradbury et al. |
| 2013/0246752 A1* | 9/2013 | Bradbury ............ G06F 9/30018 712/220 |
| 2013/0326201 A1 | 12/2013 | Gopal et al. |
| 2014/0095842 A1 | 3/2014 | Caprioli et al. |
| 2015/0074383 A1 | 3/2015 | Bradbury |
| 2015/0248293 A1* | 9/2015 | Gschwind ........... G06F 9/30036 712/225 |
| 2015/0254077 A1* | 9/2015 | Boettcher ........... G06F 9/30036 712/4 |
| 2016/0224448 A1* | 8/2016 | Park ...................... G06F 11/263 |
| 2017/0123792 A1* | 5/2017 | Rozario ................ G06F 9/3012 |

FOREIGN PATENT DOCUMENTS

| | | |
|---|---|---|
| WO | 2013135556 A1 | 9/2013 |
| WO | 2014105195 A1 | 7/2014 |

OTHER PUBLICATIONS

International Business Machines Corporation, "List of IBM Patents or Patent Applications Treated as Related," Dated Feb. 21, 2017. 2 pages.

Lin, Yu-Hsiu, et al; "Applications of hierarchical support vector machines for identifying load operation in nonintrusive load monitoring systems." In Intelligent Control and Automation (WCICA), 2011 9th World Congress on, pp. 688-693. IEEE, 2011.

US Application entitled, "Vector Storage Instruction Having Instruction-Specified Byte Count to be Stored Supporting Big and Little Endian Processing,", U.S. Appl. No. 14/941,166, filed Nov. 13, 2015.

* cited by examiner

VECTOR STORE INSTRUCTION HAVING INSTRUCTION-SPECIFIED BYTE COUNT TO BE STORED SUPPORTING BIG AND LITTLE ENDIAN PROCESSING

CROSS-REFERENCE TO RELATED APPLICATIONS

This application is related to U.S. patent application Ser. No. 14/941,166, titled "Vector Load With Instruction-Specified Byte Count Less than a Vector Size for Big and Little Endian Processing" filed concurrently herewith, the contents of which are incorporated herein by reference.

BACKGROUND

The present disclosure generally relates to data processing, and more specifically, to a variable-length vector store instruction.

Vectors are collections of scalar values, also referred to as vector elements. A processor can perform operations on vector data values simultaneously, thus providing more efficient operations. During vector operations, it may be necessary to process portions of a vector. For example, in a simple DO loop, two vectors of numbers may be added and stored in a third vector.

```
for (i=0; i<7; i++)
    z[i] = x[i] + y[i]
```

Vectorization is most optimal when the number of elements i in the operation is a multiple of the vector length. The vector length is implemented by the specifics of the processing hardware. For example, single precision computations have a vector length of four in one implementation. Four single precision elements are in a vector. So, vectorization works best if i, above, is a multiple of four.

Problems can occur when i is not a multiple of the vector length (four). A scalar is left over, which is sometimes referred to as "residue." In the example above, i=7. The first four elements are stored with a vector store operation. However, a second vector store operation might store the three leftover elements (residue) and then try to store a fourth element in memory where the operation may not be allowed to access.

If i=7 is known at compile time, the compiler can determine to perform one vector operation followed by three scalar operations for the three residue elements. However, this leads to "code bloat." The number of operations performed is much greater than performing two vector operations, for example, if i had been equal to 8. Similarly, i may not be known at compile time. If i is not known at compile time but is computed at runtime, the program does not know what i is, so controls are needed to test if i is a multiple of vector length or if there are residue elements left over. Then it must be determined how many residue elements there are, etc. This type of operation also leads to code bloat.

In addition, storing four elements when only three are needed may result in the store spanning a page boundary, with the fourth element on a page that the program doesn't have read access to. So a page fault may occur.

Other solutions include a store vector under mask. This solution provides a vector store but also provides the ability to specify a mask so that only certain elements are stored. However, this can lead to complications as well (when exceptions occur, etc.). A bit mask can lead to scenarios where only portions of byte might be written, leading to extreme complexity for hardware designers because updating portions of a byte is complex and must be performed atomically to avoid race conditions. Other disadvantageous aspects of a mask include the costly computations of the mask.

In another aspect of vector operations, programmers need both "big endian" and "little endian" execution processing to be addressed. The term "endian" refers to how bytes of a multi-byte element are ordered within memory as data is moved between registers and memory. A big endian processor stores the most significant byte of a multi-byte element in the lowest address of a consecutive range, and stores the least significant byte in the highest address. In contrast, a little endian processor stores the least significant byte in the lowest address.

Therefore, a need exists for the ability to process operations that specify a length that is not a multiple of the implemented vector length and to support both big and little endian processing.

SUMMARY

One embodiment presented herein discloses a method for storing variable length vector data. The method generally includes obtaining, by the processor, a variable-length vector store instruction. The method also includes determining that the vector store instruction specifies a vector register for a source, a memory address, and a length, where the memory address and the length are each specified in at least a general purpose register. The method also includes determining whether data should be stored into memory at the memory address using big endian byte-ordering or little endian byte-ordering. The method further includes storing data from the vector register into memory, where if the length is less than a length of the vector register, storing only the data from the vector register specified by the length.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Embodiments presented herein disclose techniques for implementing a variable length vector store instruction. More specifically, techniques provide for a variable length vector store instruction that specifies an address in memory to store data to. The instruction also specifies the length (number of bytes) to be stored. The address and length may be specified using general purpose registers, which are lower latency than special purpose registers. Embodiments described herein store data based on either big endian byte-ordering or little endian byte-ordering. If the length of the data to be stored in memory is less than the length of the vector register, only the number of bytes equal to the length is stored. Therefore residue data can be vectorized when the length of the data is less than the vector length.

Figure 1:
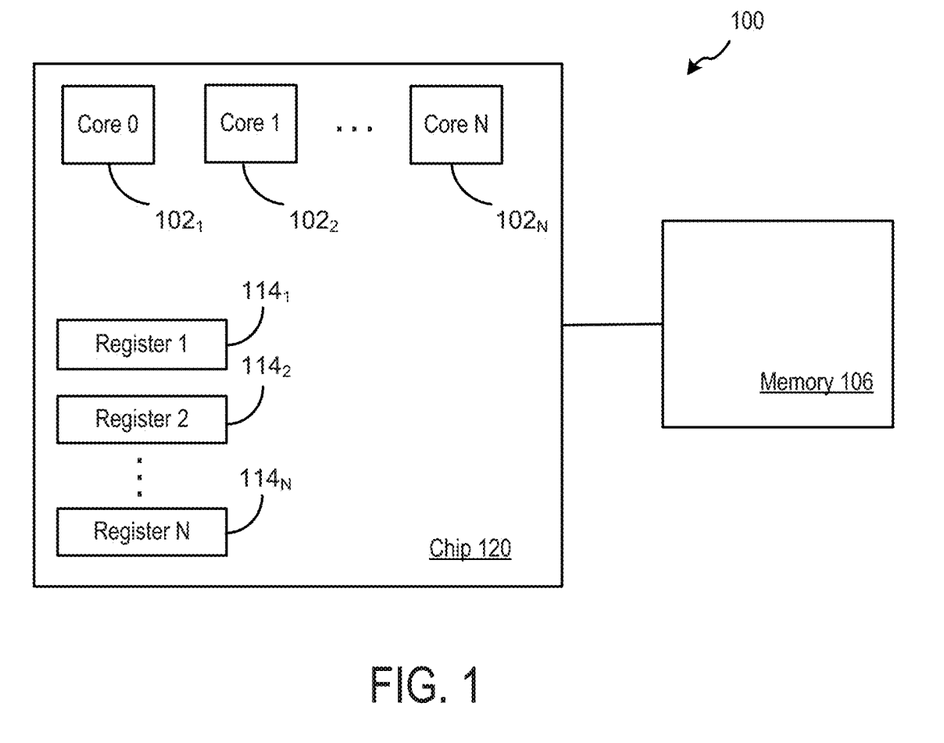
FIG. 1 illustrates an example multi-core processor, according to one embodiment.

FIG. 1 illustrates a computer system 100 according to one embodiment. The computer system 100 includes a chip 120 that includes one or more processor cores 102, shown as Core 1, Core 2, ..., Core N. Embodiments described herein may utilize any number N of processor cores. In other embodiments, components of system 100 shown as on chip 120 may be located off the chip, and components of system 100 shown as off chip 120 may be located on the chip.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Memory 106 is operable to store data that may be retrieved for vector operations.

Computer system 100 also comprises registers 114. Embodiments described herein may utilize any number P of registers 114, and each register 114 may be any length. Registers 114 store bits of information that can be read out or written. Registers 114 may be vector registers, general purpose registers, special purpose registers, or any other suitable register type. The operation and use of registers 114 is described in further detail below.

An example Store Vector with Length instruction according to an embodiment is described herein. This instruction stores data from a vector register into memory. The mnemonic for the Store Vector with Length instruction is stxvl in this embodiment. Data of a specific length from a vector register is stored in memory. One form of the instruction is:

(stxvl vSRC, rADDR, rLEN)

where vSRC specifies the source vector register, rADDR specifies the address in memory where the data will be stored, and rLEN specifies the length of the data to be stored.

The address rADDR can be specified in a general purpose register in one embodiment. A general purpose register has low latency compared to a special purpose register. A single register may be used to specify the address in one implementation. The address can support a variety of addressing modes, such as base, base+immediate, base+index, or base+index+immediate.

The length rLEN may also be specified in a low latency general purpose register. If the vector length is specified by VL, the instruction stores VL bytes, when length≥VL. When 0<length<VL, the instruction stores rLEN bytes from vSRC. When the length is 0, no access is performed, and storage is not modified.

Data is stored into memory in the proper order, depending on whether the system is uses big endian byte-ordering or little endian byte-ordering. For big endian, data is stored into memory from left to right. For little endian, data is stored into memory from right to left. The determination of whether the system uses big endian or little endian can be controlled by a mode bit in a control register (such as a machine state register, or MSR), by an instruction operand, by an opcode, or by any other suitable method.

The stxvl instruction provides a number of advantages. The stxvl instruction has a single-register source, which can be either a scalar or a vector register. The length rLEN is specified in a low-latency general purpose register instead of a high-latency special purpose register. The instruction has a performance equivalent to a normal vector store. In addition, a partial register store creates the effect of support for a vector length less than VL. The stxvl function is useful for functions like strcpy(dst,src), which copies a string from a source to a destination. String length is derived from loading src, whereas string can then be efficiently stored to dst using the computed length.

Figure 2:
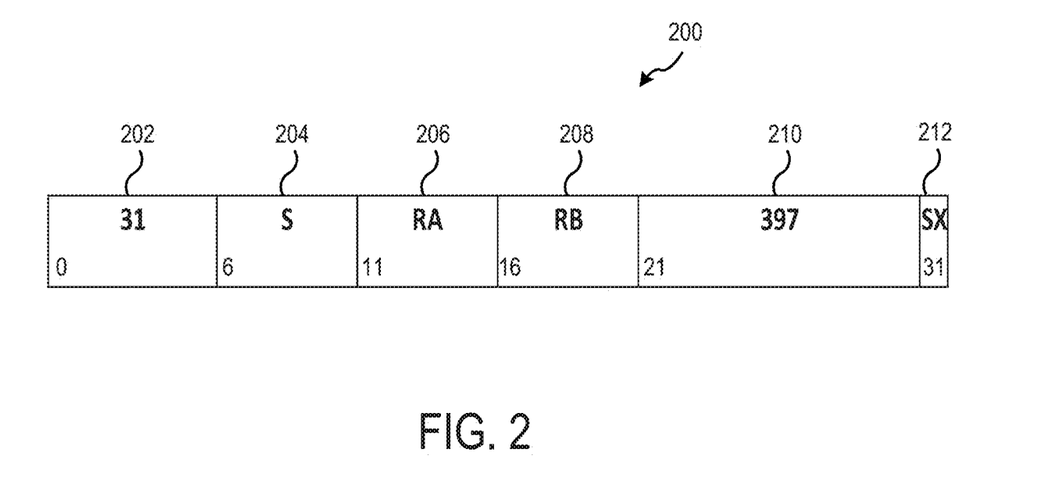
FIG. 2 illustrates an example store vector with length instruction according to an embodiment.

FIG. 2 illustrates an example Store Vector with Length instruction 200 according to an embodiment. Operands for the stxvl instruction are XS (the target register), RA (the general purpose register address specification 206), and RB (the length of the general purpose register specification 208). Operands 31 (202) and 397 (210) are opcode fields that identify the instruction. The S field (204) and the SX field (212) specify an XS operand. RA 206 and RB 208 are explicitly identified, and reside in a contiguous field in the instruction encoding as shown.

In this embodiment, two ranges of source vector registers are used. The combination of the S and SX fields produces a 6-bit result. SX is the most significant bit of those six bits. This allows a source register from 0 to 63 to be specified. The first 32 registers are controlled by a VSX bit in a machine state register. The second 32 registers are controlled by a VEC bit in a machine state register. If a control bit in the MSR is equal to zero, then the vector register is unavailable, and an interrupt may issue.

---

If SX=0 & MSR.VSX=0 then VSX_Unavailable ( )
If SX=1 & MSR.VEC=0 then Vector_Unavailable( )

---

Other operations describing how the instruction works are as follows.

EA←(RA=0)? 0: GPR [RA]

EA is the effective address. The left arrow signifies an assignment operator. If the general purpose register address specification RA equals 0, the value 0 is used. Otherwise, the value that is in the general purpose register is used as the effective address of memory where the data will be stored.

nb←Clamp (EXTZ (GPR[RB].bit[0:7]), 16)

nb determines the actual length. The leftmost eight bits of GPR [RB] are an unsigned integer value. If nb is equal to 0, no access is performed.

--- if MSR.LE = 0 then       // Big Endian byte-ordering
   store_data ← VSR[32xSX+S].byte[0:nb−1]
else                     // Little Endian byte-ordering
   store_data ← VSR[32xSX+S].byte[16−nb:15]

---

If the LE bit in the machine state register is 0, then the system is using big endian byte-ordering. If nb is less than 16, the contents of the leftmost nb bytes of VSR[XS] are placed in storage starting at address EA. Otherwise, the contents of VSR[XS] are placed into the quadword in storage at address EA.

If the LE bit in the machine state register is not 0, then the system is using little endian byte-ordering. In that instance, if nb is less than 16, the contents of the rightmost nb bytes of VSR[XS] are placed in storage starting at address EA in byte-reversed order. Otherwise, the contents of VSR[XS] are placed into the quadword in storage at address EA in byte-reversed order.

Therefore, as described above, a store vector with length instruction may be used to effectively store data from source vector registers into memory even if the length of the data does not match the length of the vector register. In addition, low-latency general purpose registers are used and the instruction works with both big and little endian processing.

Figure 3:
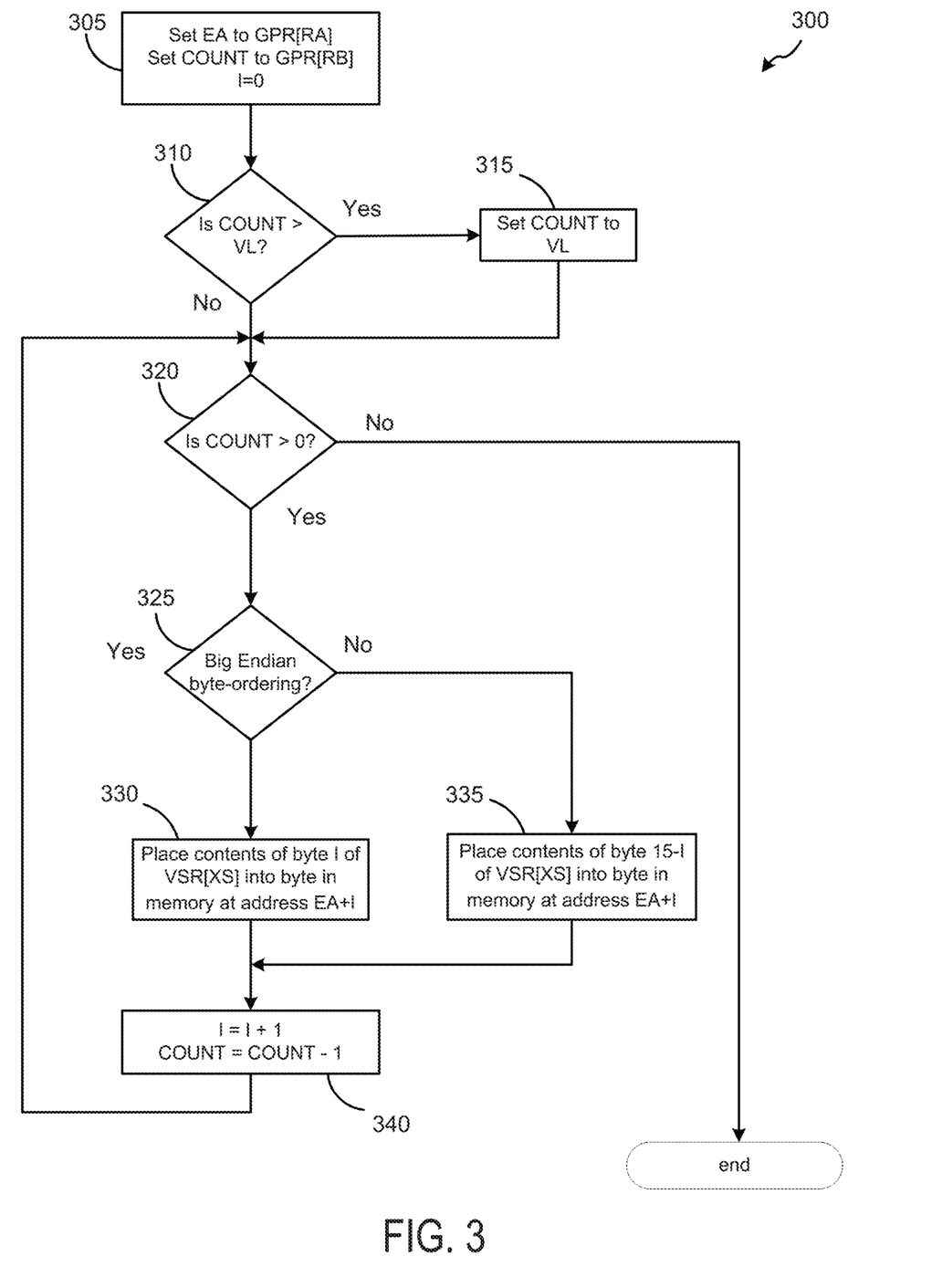
FIG. 3 is a flowchart illustrating an example method for storing a vector with length, according to one embodiment.

FIG. 3 is a flowchart illustrating an example method 300 for storing a vector with length, according to one embodiment. Although the method steps are described in conjunction with the systems of FIGS. 1-2, persons skilled in the art will understand that any system configured to perform the method steps, in any order, falls within the scope of the present invention. In various embodiments, the hardware and/or software elements described above in FIGS. 1-2 can be configured to perform the method steps of FIG. 3. As an example, processor chip 120 can perform the steps of FIG. 3.

The method 300 begins at step 305, where the effective address EA is set to the contents of the GPR[RA] operand. In addition, a variable COUNT is set to the contents of GPR[RB], which is the length. Finally, a variable I is set to 0.

The method proceeds to step 310, where a decision block determines if COUNT is greater than the vector length VL. If COUNT is greater than the vector length, COUNT is set to the vector length at step 315 and the method proceeds to step 320. If COUNT is not greater than VL at decision block 310, the method proceeds to step 320.

At step 320, the method determines whether COUNT is greater than 0. If it is not, the method ends as shown. However, if COUNT is greater than zero, the method proceeds to step 325.

At step 325, the method determines if the byte-ordering is big endian. As described above, the determination of whether the system uses big endian or little endian can be controlled by a mode bit in a control register (such as a machine state register, or MSR), by an instruction operand, by an opcode, or by any other suitable method. If the byte-ordering is big endian, the method proceeds to step 330, where the contents of byte I of VSR[XS] are placed into a byte in memory at address EA+I.

If the byte-ordering is not big endian, the method proceeds to step 335 where the contents of byte 15-I of VSR[XS] are placed into a byte in memory at address EA+I. Therefore, step 325 allows the method to work with either big endian or little endian byte-ordering by placing the data in the appropriate byte in memory.

After the data is placed into memory at either step 330 or step 335, the method proceeds to step 340. At this step, I is incremented by 1 and COUNT is decremented by 1. Then, the method loops back to step 320. If COUNT is still greater than 0, the method proceeds again to step 325 to determine the byte-ordering. If the COUNT has reached zero, the method ends as shown.

At the end of the method, the data from the source register has been stored into the appropriate address in memory.

Also, the data is stored with the appropriate byte-ordering for the system, either big endian or little endian.

Figure 4:
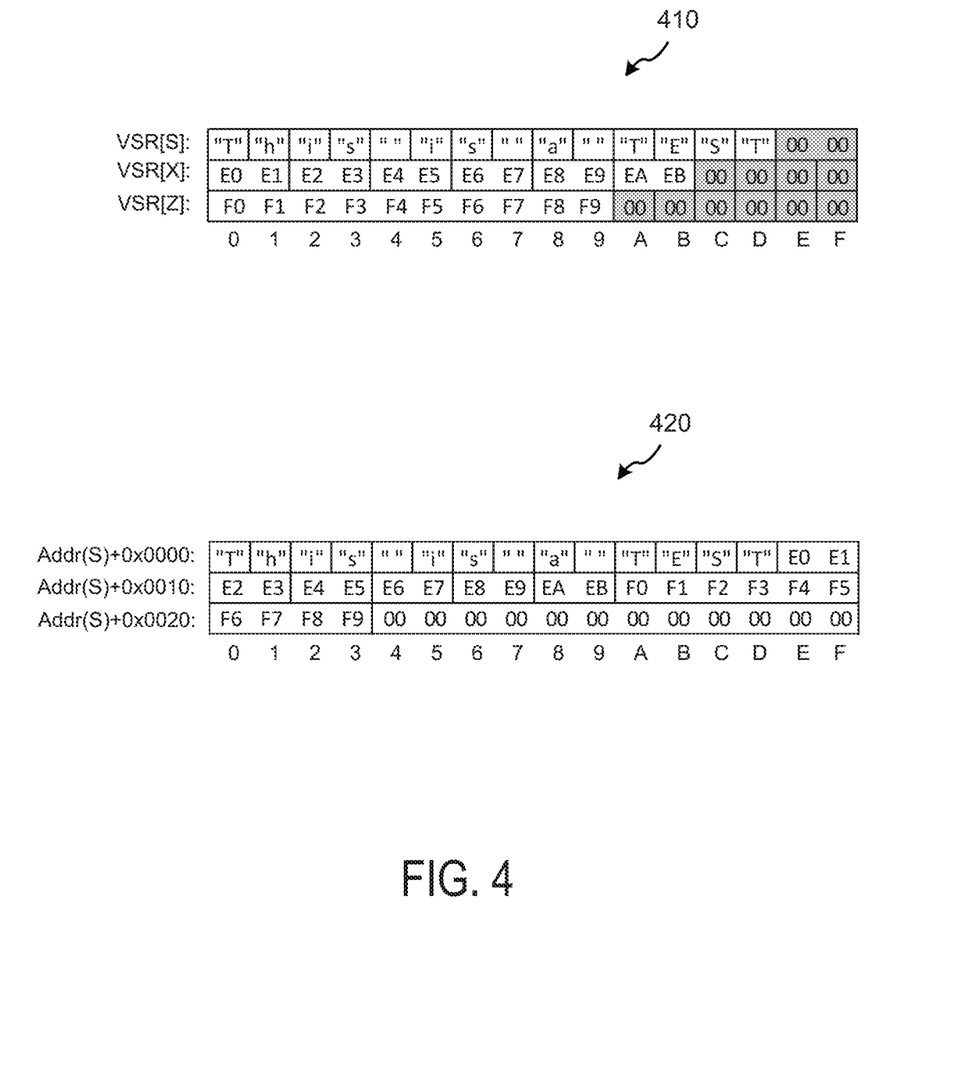
FIG. 4 illustrates storing a vector to big endian storage, according to an embodiment.

FIG. 4 illustrates storing a vector into big endian storage, according to an embodiment. An example is given of storing less than 16-byte data into big endian storage from VSR[XS] using stxvl, a store vector with length instruction.

Vector register images 410 illustrate a big endian byte-ordering of data S, X, and Z in three different vector registers:

| | |
|---|---|
| char | S[14] = "This is a TEST"; |
| short | X[6] = {0xE0E1, 0xE2E3, 0xE4E5, 0xE6E7, 0xE8E9, 0xEAEB }; |
| binary80 | Z = 0xF0F1F2F3F4F5F6F7F8F9 |

Vector register names are shown to the left of vectors register images 410. The position of the byte in the vector is shown at the bottom of vector register images 410. Storing the data from vector registers S, X, and Z to storage is accomplished with the following in one embodiment:

| | | |
|---|---|---|
| # Assumptions | | |
| # GPR[NS] | = 14 (length of S in # of bytes) | |
| # GPR[NX] | = 12 (length of X in # of bytes) | |
| # GPR[NZ] | = 10 (length of Z in # of bytes) | |
| # GPR[PS] | = address of S | |
| add | rPX,rPS,rNS | # address of X |
| add | rPZ,rPX,rNX | # address of Z |
| sldi | rLS,rNS,56 | |
| sldi | rLX,rNX,56 | |
| sldi | rLZ,rNZ,56 | |
| stxvl | xS,rPS,rLS | |
| stxvl | xX,rPX,rLX | |
| stxvl | xZ,rPZ,rLZ | |

Note that sldi is a shift left doubleword immediate instruction. The result of the above instructions is illustrated in storage 420. The character string S ("This is a TEST") is stored in memory at address 0x0000. The short integer X is stored in memory in the addresses following the character string S. The floating point value Z is stored in memory following the short integer. The data is stored using big endian byte-ordering.

Figure 5:
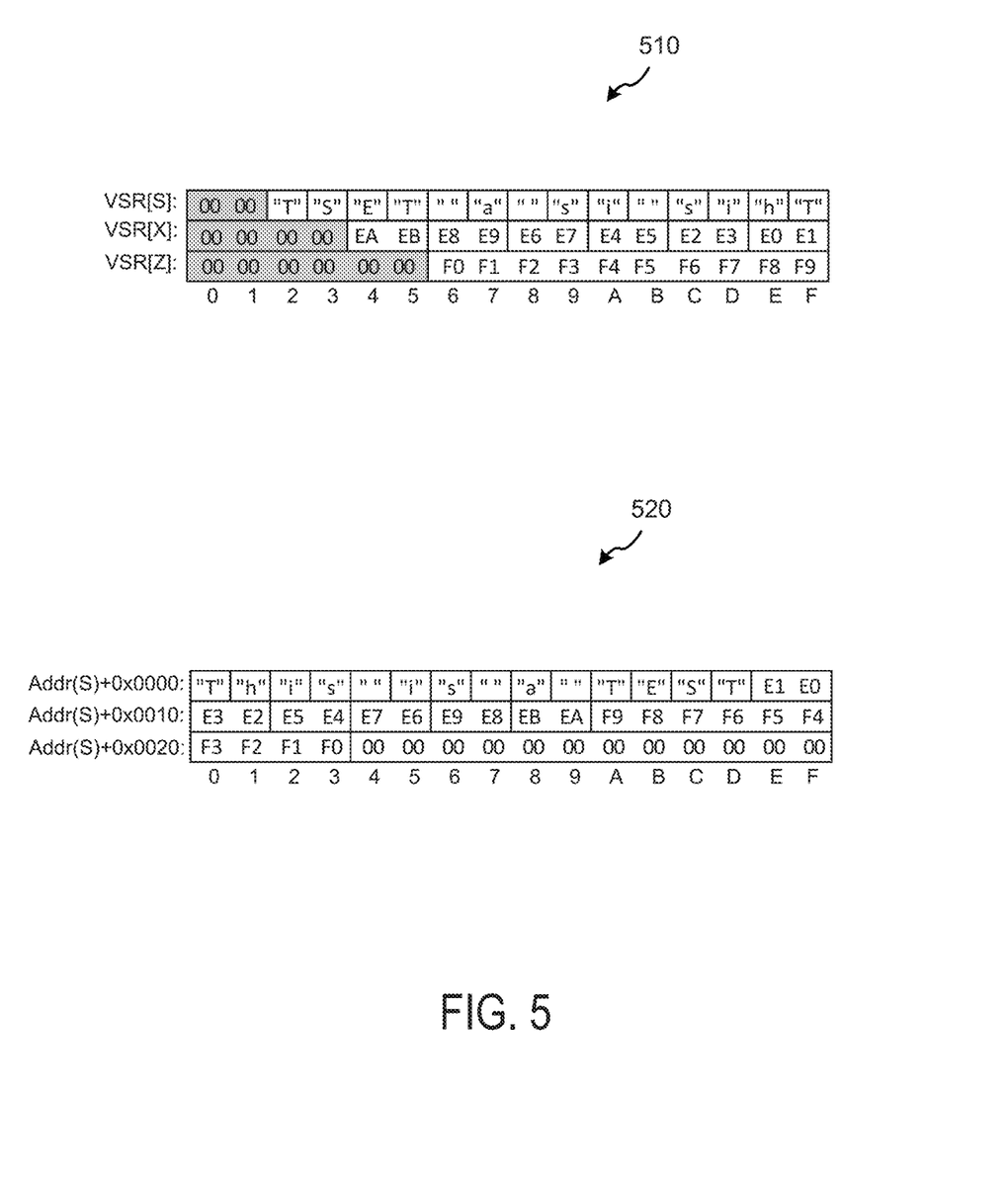
FIG. 5 illustrates storing a vector to little endian storage, according to an embodiment.

FIG. 5 illustrates storing data from a vector into storage using little endian byte-ordering, according to an embodiment. An example is given of storing less than 16-byte data from VSR[XT] into little endian storage using stxvl, a store vector with length instruction.

Vector register images 510 illustrate a big endian byte-ordering of data S, X, and Z in three different vector registers:

| | |
|---|---|
| char | S[14] = "This is a TEST"; |
| short | X[6] = {0xE0E1, 0xE2E3, 0xE4E5, 0xE6E7, 0xE8E9, 0xEAEB }; |
| binary80 | Z = 0xF0F1F2F3F4F5F6F7F8F9 |

Vector register names are shown to the left of vector register images 510. The position of the byte in the vector is shown at the bottom of vector register images 510. Storing the data from vector registers S, X, and Z to storage is accomplished with the following in one embodiment:

| | |
|---|---|
| # Assumptions | |
| # GPR[NS] | = 14 (length of S in # of bytes) |
| # GPR[NX] | = 12 (length of X in # of bytes) |

```
# GPR[NZ]   = 10 (length of Z in # of bytes)
# GPR[PS]   = address of S
add         rPX,rPS,rNS      # address of X
add         rPZ,rPX,rNX      # address of Z
sldi        rLS,rNS,56
sldi        rLX,rNX,56
sldi        rLZ,rNZ,56
stxvl       xS,rPS,rLS
stxvl       xX,rPX,rLX
stxvl       xZ,rPZ,rLZ
```

The result of the above instructions is illustrated in storage 520. The character string S ("This is a TEST") is stored in memory at address 0x0000. The short integer X is stored in memory in the addresses following the character string S. The floating point value Z is stored in memory following the short integer. The data is stored using little endian byte-ordering. The results of little endian storage in storage 520 can be compared to the big endian storage in storage 420.

Figure 6:
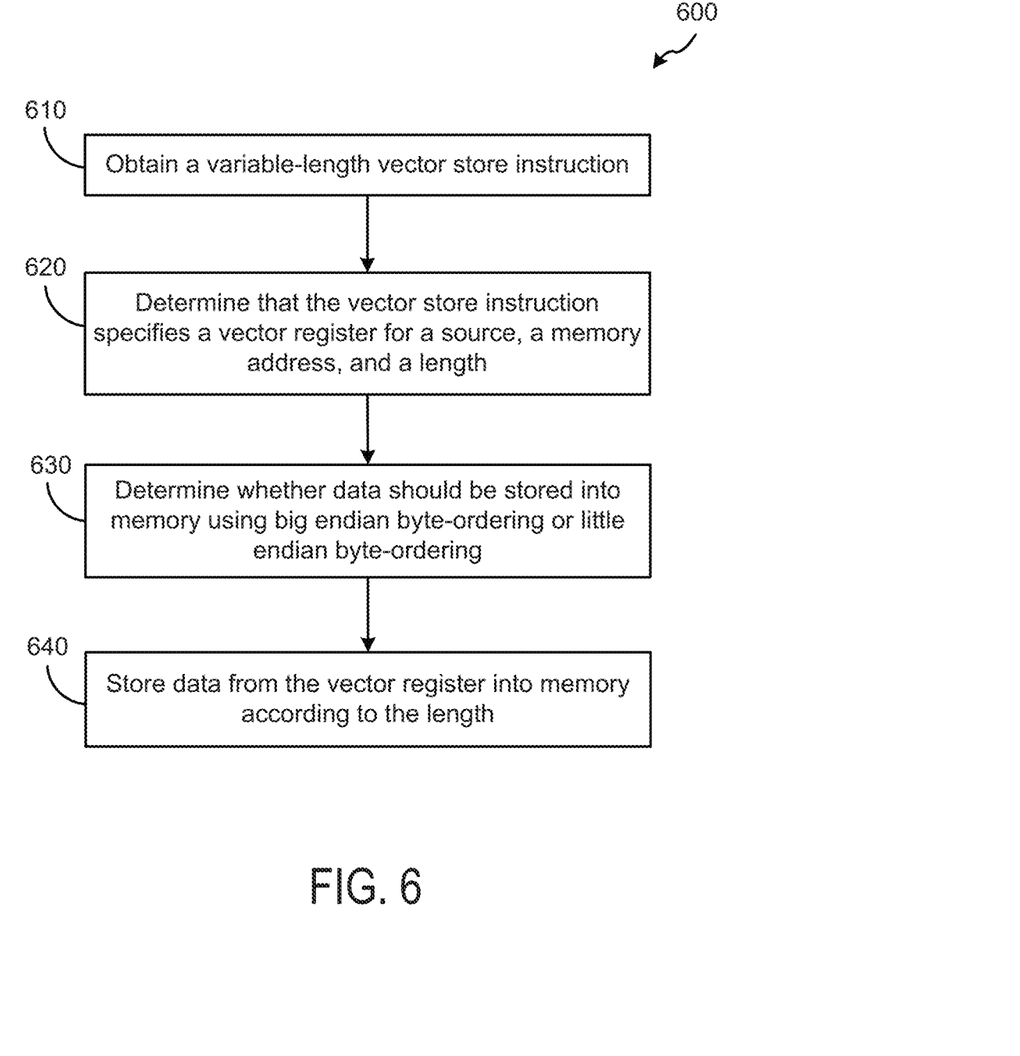
FIG. 6 is a flowchart illustrating an example method for storing a vector with length, according to one embodiment.

FIG. 6 is a flowchart illustrating an example method 600 for storing a vector with length, according to one embodiment. Although the method steps are described in conjunction with the systems of FIGS. 1-5, persons skilled in the art will understand that any system configured to perform the method steps, in any order, falls within the scope of the present invention. In various embodiments, the hardware and/or software elements described above in FIGS. 1-5 can be configured to perform the method steps of FIG. 6. As an example, processor chip 120 can perform the steps of FIG. 6.

The method begins at step 610, where a processor obtains a variable-length vector store instruction, such as stxlv, as described above. The method proceeds to step 620, where the processor determines that the vector store instruction specifies a vector register for a source, a memory address, and a length. In some embodiments, the memory address and the length are each specified in at least a general purpose register. General purpose registers are low latency compared to special purpose registers. In some embodiments, architectures that support longer instruction encodings could support specification of more complex addressing modes and lengths involving more than a single register.

The method proceeds to step 630, where the processor determines whether data should be stored into memory using big endian byte-ordering or little endian byte-ordering. For big endian, data is loaded into memory from left to right. For little endian, data is loaded into memory from right to left. The determination of whether the system uses big endian or little endian can be controlled by a mode bit in a control register (such as an MSR), by an instruction operand, by an opcode, or by any other suitable method. In other embodiments, if a first byte-ordering is determined, data may be stored in the leftmost bytes. The first byte-ordering may be big endian or little endian depending on the embodiment. If a second byte-ordering is determined, data may be stored in the rightmost bytes. The second byte-ordering may be big endian or little endian depending on the embodiment.

The method proceeds to step 640, where the processor stores data from the vector register into memory. If the length from the vector store instruction is less than a length of the vector register, the processor stores only the data from the vector register specified by the length.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the management service) or related data available in the cloud. For example, the management service could execute on a computing system in the cloud and collect usage activity data across multiple devices associated with a user. In such a case, the management service could generate break reminder notifications to send to the multiple devices and store user profile and rules data at a storage location in the cloud. Doing so allows a user to access this information from any computing system attached to a network connected to the cloud (e.g., the Internet).

While the foregoing is directed to embodiments of the present disclosure, other and further embodiments of the present disclosure may be devised without departing from the basic scope thereof, and the scope thereof is determined by the claims that follow.

What is claimed is:

1. A method for storing vector data in memory with a processor, the method comprising:
   obtaining, by the processor, a variable-length vector store instruction that comprises (i) an SX field, (ii) an S field, (iii) an RA field specifying a general purpose register address specification for a memory address, (iv) an RB field specifying a length of the general purpose register address specification, and (v) one or more fields identifying the variable-length vector store instruction, wherein at least two ranges of vector registers for a source are available, wherein each of the at least two ranges of vector registers for the source is controlled by a respective one or more bits in a machine state register;
   selecting one of the at least two ranges of vector registers for a target, based on the SX field within the variable-length vector store instruction;
   selecting a vector register for the target within the selected range of vector registers for the target, based on the S field within the variable-length vector store instruction;
   determining whether data should be stored into memory using big endian byte-ordering or little endian byte-ordering; and
   storing data from the vector register into memory by:
      iteratively storing data for each of a plurality of bytes in the variable-length vector store instruction into a memory address, wherein each iteration of a storing data comprises:
         placing a byte of the plurality of bytes in the memory address according to big endian byte-ordering or little endian byte-ordering; and
         selecting a next byte of the plurality of bytes in the variable-length vector store instruction to store into a next memory address.

2. The method of claim 1, wherein data is stored in leftmost bytes responsive to a determined first byte-ordering, and data is stored in rightmost bytes responsive to a determined second byte ordering.

3. The method of claim 1, wherein if the length is greater than or equal to a length of the vector register, storing the entire contents of the vector register into memory.

4. The method of claim 1, wherein if it is determined data should be stored into memory using big endian byte-ordering, further comprising:
   storing leftmost data from the vector register into memory.

5. The method of claim 1, wherein the length is specified in a portion of the bits in the general purpose register.

6. A computer program product, comprising:
   a non-transitory computer-readable storage medium having computer-readable program code embodied therewith, the computer-readable program code configured to perform an operation for storing vector data in memory with a processor, the operation comprising:
   obtaining, by the processor, a variable-length vector store instruction that comprises (i) an SX field, (ii) an S field, (iii) an RA field specifying a general purpose register address specification for a memory address, (iv) an RB field specifying a length of the general purpose register address specification, and (v) one or more fields identifying the variable-length vector store instruction, wherein at least two ranges of vector registers for a source are available, wherein each of the at least two ranges of vector registers for the source is controlled by a respective one or more bits in a machine state register;
   selecting one of the at least two ranges of vector registers for a target, based on the SX field within the variable-length vector store instruction;
   selecting a vector register for the target within the selected range of vector registers for the target, based on the S field within the variable-length vector store instruction;
   determining whether data should be stored into memory using big endian byte-ordering or little endian byte-ordering; and
   storing data from the vector register into memory by:
      iteratively storing data for each of a plurality of bytes in the variable-length vector store instruction into a memory address, wherein each iteration of a storing data comprises:
         placing a byte of the plurality of bytes in the memory address according to big endian byte-ordering or little endian byte-ordering; and
         selecting a next byte of the plurality of bytes in the variable-length vector store instruction to store into a next memory address.

7. The computer program product of claim 6, wherein data is stored in leftmost bytes responsive to a determined first byte-ordering, and data is stored in rightmost bytes responsive to a determined second byte ordering.

8. The computer program product of claim 6, wherein if the length is greater than or equal to a length of the vector register, storing the entire contents of the vector register into memory.

9. The computer program product of claim 6, wherein if it is determined data should be stored into memory using big endian byte-ordering, further comprising:
   storing leftmost data from the vector register into memory.

10. The computer program product of claim 6, wherein the length is specified in a portion of the bits in the general purpose register.

11. A system, comprising:
    a processor; and
    a memory storing a program, which, when executed on the processor, performs an operation for storing a vector, the operation comprising:
       obtaining, by the processor, a variable-length vector store instruction that comprises (i) an SX field, (ii) an S field, (iii) an RA field specifying a general purpose register address specification for a memory address, (iv) an RB field specifying a length of the general purpose register address specification, and (v) one or more fields identifying the variable-length vector store instruction, wherein at least two ranges of vector registers for a source are available, wherein each of the at least two ranges of vector registers for the source is controlled by a respective one or more bits in a machine state register;
       selecting one of the at least two ranges of vector registers for a target, based on the SX field within the variable-length vector store instruction;
       selecting a vector register for the target within the selected range of vector registers for the target, based on the S field within the variable-length vector store instruction;
       determining whether data should be stored into memory using big endian byte-ordering or little endian byte-ordering; and storing data from the vector register into memory by:
iteratively storing data for each of a plurality of bytes in the variable-length vector store instruction into a memory address, wherein each iteration of a storing data comprises:
placing a byte of the plurality of bytes in the memory address according to big endian byte-ordering or little endian byte-ordering; and
selecting a next byte of the plurality of bytes in the variable-length vector store instruction to store into a next memory address.

12. The system of claim 11, wherein data is stored in leftmost bytes responsive to a determined first byte-ordering, and data is stored in rightmost bytes responsive to a determined second byte ordering.

13. The system of claim 11, wherein if the length is greater than or equal to a length of the vector register, storing the entire contents of the vector register into memory.

14. The system of claim 11, wherein if it is determined data should be stored into memory using big endian byte-ordering, further comprising:
storing leftmost data from the vector register into memory.

15. The system of claim 11, wherein the length is specified in a portion of the bits in the general purpose register.

* * * * *